United States Patent
Wong et al.

[11] Patent Number: 5,963,192
[45] Date of Patent: Oct. 5, 1999

[54] APPARATUS AND METHOD FOR FLICKER REDUCTION AND OVER/UNDERSCAN

[75] Inventors: Raymond M.Y. Wong, Milpitas; Richard L.C. Chang, Cupertino, both of Calif.

[73] Assignee: Silicon Motion, Inc., San Jose, Calif.

[21] Appl. No.: 08/729,183

[22] Filed: Oct. 11, 1996

[51] Int. Cl.$^6$ .................................................. G09G 5/02
[52] U.S. Cl. ........................ 345/150; 345/502; 345/519; 345/112; 345/113
[58] Field of Search ................................... 345/112, 113, 345/115, 507, 3, 132, 519, 502, 150; 348/446, 447, 600, 448

[56] References Cited

U.S. PATENT DOCUMENTS

| | | | |
|---|---|---|---|
| 4,393,394 | 7/1983 | McCoy | 358/22 |
| 5,473,342 | 12/1995 | Tse et al. | 345/132 |
| 5,510,843 | 4/1996 | Keene et al. | 348/446 |

OTHER PUBLICATIONS

Product Data Book, *86CM65 Aurora64V+ Dual Display Accelerator*, Section 11: Flat Panel Interface, S3 Incorporated, Santa Clara, California (Jul. 1996) pp. 1–14.

*Primary Examiner*—Wellington Chin
*Assistant Examiner*—Keith Ferguson
*Attorney, Agent, or Firm*—Blakely, Sokoloff, Taylor & Zafman; Hopkins & Carley

[57] ABSTRACT

A single-chip video-graphics controller includes a novel circuit for eliminating full line buffers when reducing line-to-line flicker in a display image of non-interlaced data on an interlaced color display device such as an NTSC or PAL television projector. The flicker reduction circuit uses a pair of memory access agents for concurrently fetching even and odd interlace frames of the display image. Corresponding color pixels of the two frames are averaged on-the-fly, and the averaged output is converted to analog RGB output signals for driving the display device. The elimination of the full line buffers results in a savings of approximately 30,000 transistors per buffer and a corresponding reduction in operating power. A specific embodiment of the controller includes a vertical stretching circuit used to adjust the number of vertical lines corresponding to the display image permitting the vertical reformatting of any display image.

10 Claims, 6 Drawing Sheets

APPARATUS AND METHOD FOR FLICKER REDUCTION AND OVER/UNDERSCAN

BACKGROUND

1. Field of the Invention

The invention relates to video-graphics controllers and in particular to a single-chip processor for the simultaneous display of color image data on two display devices having inconsistent refresh requirements, such as interlaced TV and color DSTN.

2. Background of the Invention

Portable computers (e.g., laptops, notebooks, etc.) are becoming more powerful and are currently being used for multimedia video-graphics presentations in which a color image is displayed simultaneously on a CRT monitor or color television receiver and the computer's own flat-panel color display. Or the CRT or TV is used to display a color presentation while the portable's color display is used to display an outline of the presentation for use by the presenter.

At the present time, no single-chip video-graphics controller can handle such diverse display needs because the refresh rates for the CRT/TV and the flat-panel display are not compatible. The current solution to the problem is to use two different controllers, each specialized for the particular display device it must control. Such an arrangement is both expensive and power consuming since both controllers operate all the time.

What is needed is a controller architecture which will permit the functions of the two controllers to be incorporated into a single chip and which permits a wide variety of display types to be accommodated by appropriate programming while offering the power savings inherent with a single-chip device.

SUMMARY OF THE INVENTION

In a preferred embodiment of the present invention, a single-chip video-graphics controller displays a color image stored in an external display memory simultaneously on two devices having entirely different refresh requirements. The controller includes a first display processor which fetches the color image from the external memory and displays the image on a first display device, such as a color CRT monitor or TV. The controller reduces the bandwidth of the fetched color image on-the-fly and stores a copy of the reduced bandwidth image in another part of the external display memory. A second display processor fetches the reduced bandwidth copy at a rate compatible with a second display device, such as a DSTN flat-panel device using dithering for color depth enhancement. The two display processes are independent of each other, and provide outputs compatible with, and at a refresh rate meeting the specific requirements of each display device.

In a specific embodiment of the invention, the controller includes a circuit which averages adjacent display lines to reduce flicker on a television receiver used as a display device. This feature permits the controller to display indexed-color mode images on a TV using flicker reduction.

In yet another embodiment of the invention, the flicker reduction circuit is used to adjust the number of lines in one display format for presentation in a different display format. The adjustment typically requires the elimination of predetermined lines from the original data so that the remaining number of lines is compatible with the second display format.

BRIEF DESCRIPTION OF THE DRAWINGS

For a further understanding of the objects, features and advantages of the present invention, reference should be made to the following description of the preferred embodiment, taken in conjunction with the accompanying drawing, in which like parts are given like reference numerals and wherein.

DESCRIPTION OF THE PREFERRED EMBODIMENT

Figure 1:
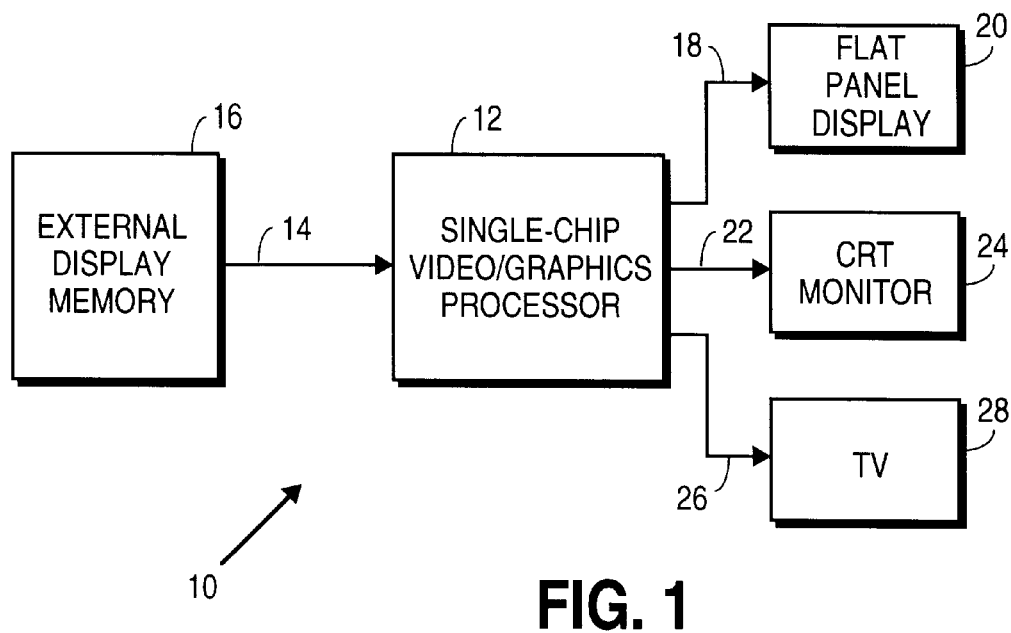
FIG. 1 is a block diagram of a multimedia display system according to one aspect of the present invention.

With respect to FIG. 1 there is shown a multimedia display system designated generally by the numeral 10. The multimedia display system 10 includes a single-chip video-graphics controller 12, communicating via an address and data bus 14 with an external display memory 16. The multimedia display system 10 also includes output lines 18 connecting the video-graphics controller 12 to a flat panel display 20, output lines 22 connecting to a CRT monitor 24, and output lines 26 connecting to a standard television receiver 28. The multimedia display system 10 is the context within which the present invention is practiced. As will become clear below, a preferred embodiment of the invention is directed to the internal architecture of the single-chip video-graphics controller 12.

A few definitions are appropriate before proceeding. Signals are referred to both by signal name, by function and by the line(s) or wire(s) that carry the signals, as is a common practice in the electronics industry. A distinction between any of these styles will be made when necessary to make the meaning clear. The expression "on-the-fly" is used at several places in this Specification. The expression refers to a stream of color pixels which is fetched from memory in portions, and to a process operating on the individual pixels of the stream in a sequential order. Such processing is said to be done "on-the-fly" because the entire stream is not present at any time except in memory. The expression "FIFO" is used repeatedly throughout this Specification. A FIFO is a dynamic data storage device which receives items and then releases them in the order in which they were received. A FIFO is used to fetch a stream of color pixels a portion at a time. The FIFO is used to smooth the delivery of the stream which is usually obtained rapidly in short portions at infrequent intervals and then released smoothly to some using process, the number of items in the FIFO increases and decreases as required to maintain the smooth delivery. The letters stand for "first in, first out."

Simultaneous Display: Inconsistent Refresh Rates and Types

The phrase Virtual Refresh™ is a trademark of the assignee of the present invention. In general the phrase refers to a novel architecture simplifying the display of a color image simultaneously on two display devices having different display process requirements and screen refresh rates-a task formerly possible only using separate controllers. In addition, the Virtual Refresh™ architecture reduces congestion on the shared display memory address and data bus, thereby maintaining high image quality. Finally, the architecture the slowing or shutting down of unused portions of the controller, offering a significant reduction in operating power under typical circumstances.

Figure 2:
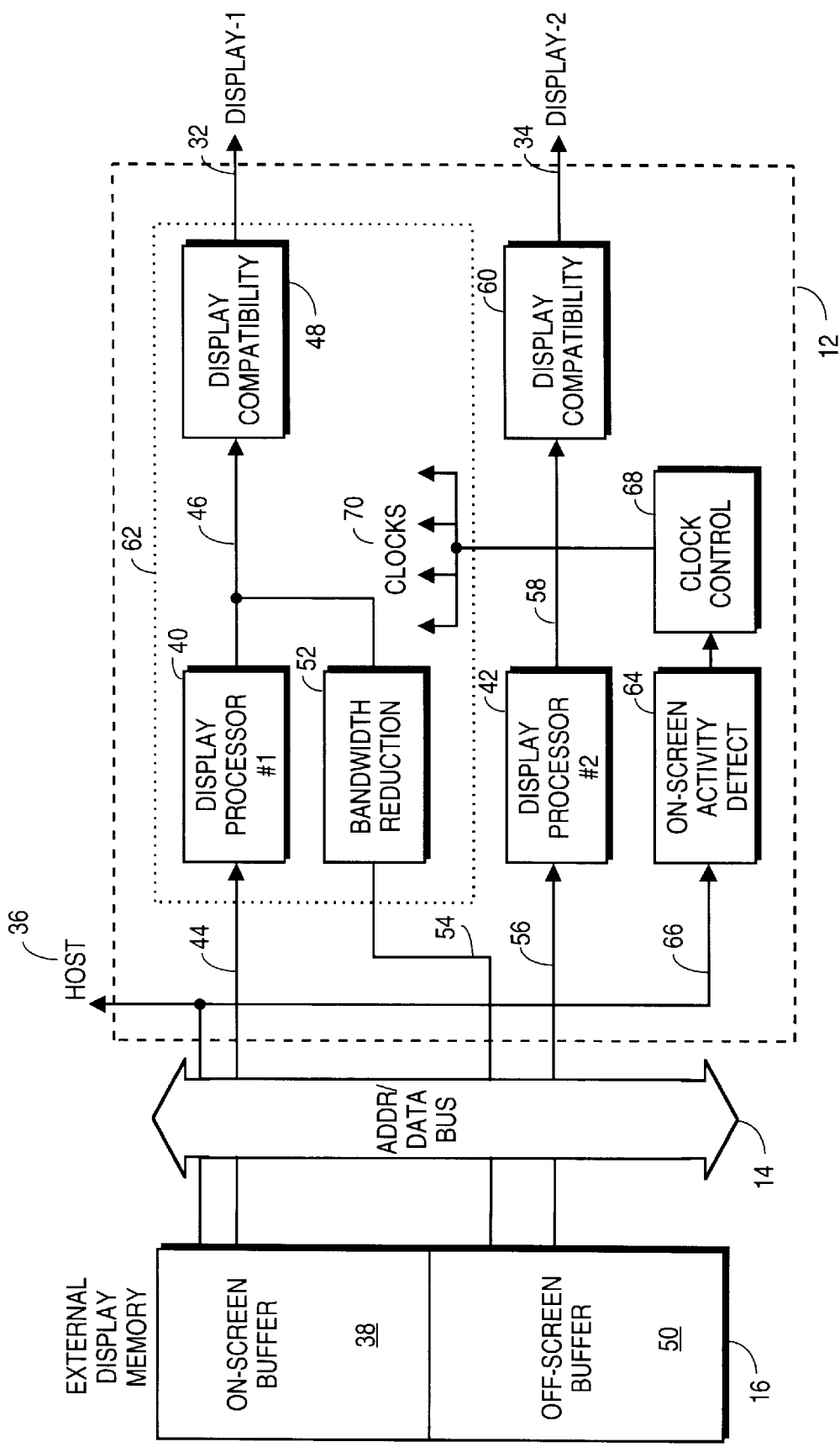
FIG. 2 is a block diagram illustrating a single-chip video-graphics controller used in the multimedia display system of FIG. 1.

The novel Virtual Refresh™ architecture is illustrated in a simplified block diagram form in FIG. 2, which shows a portion of the multimedia display system 10. The illustrated portion is designated generally in by the numeral 30 and includes the single-chip video-graphics controller 12, the shared address and data bus 14, the external display memory 16, and has output lines 32 and 34 for connection to first and second display devices.

In general a host 36, such as a microprocessor, places color pixel data representing a display image into an on-screen buffer portion 38 of the external display memory 16. A first display processor 40 accesses the color pixel data from the on-screen buffer 38 for display on the first display device, while a second display processor 42 simultaneously accesses data from the external display memory 16 for display on the second display device of a different type and having different display and refresh requirements.

The host 36 and the first and the second display processors 40, 42 share the common address and data bus 14 for access to the external display memory 16. The rate at which the host 36 accesses the external display memory 16 is determined by the rate at which the display image changes over time—the more rapidly the image changes, the more frequent the host memory accesses, and vice versa. The first and the second display processors 40, 42 access the external display memory 16 at different rates. These access rates depend upon the individual display and refresh needs of the particular display devices being used, and in general are completely independent of each other.

The three processes-the host 36, the first and the second display processors 40, 42—compete for use of the common address and data bus 14. If care is not taken in the design of the video-graphics controller 12, the available bandwidth of the shared address and data bus 14 becomes a limiting factor in the overall system performance. The quality of the displayed images is directly related to the available bus bandwidth. When it is not possible to make the necessary memory accesses during an interval of time, the display image quality suffers.

With that introduction, it is seen with respect to FIG. 2 that the first display processor 40 accesses data from the on-screen buffer 38 via lines 44 and the shared address and data bus 14. The first display processor 40 converts the accessed data, if necessary, to a 24-bit direct-color-mode format—8 bits Red, 8 bits Green, and 8 bits Blue—and presents the converted data 46 to a display compatibility circuit 48 which creates the output signals 32 need by a particular first display device. Examples of a first display device are a color CRT monitor and a color NTSC or PAL television receiver.

The process of accessing the color pixel data from the on-screen buffer 38 by the first display processor 40 occurs at a rate determined by the display and refresh needs of a specific first display device. This access process is concurrent with the host 36 accesses needed to update the information in the on-screen buffer 38 as the display image changes over time.

Depending upon the refresh needs of a particular display device and the rate at which the display image is changing over time, the host 36 and the first display processor 40 will make frequent use of the shared address and data bus 14. The display image quality will become degraded to some extent if either the host 36 or the first display processor 40 is unable to access the on-screen buffer 38 as frequently as required.

The problem is exacerbated considerably when a flat panel display device such as a color DSTN LCD device (or in some cases, a TFT device, when dithering is being used with certain color modes) is connected for simultaneous display of the same color pixel data. The DSTN devices use a standard "dithering" technique for color-depth enhancement. The dithering technique is a form of time modulation of the image data and requires many additional memory accesses to provide the rich color depth commonly associated with a high quality flat panel display.

These additional accesses are handled by the second display processor 42 using the same address and data bus 14 used by the host 36 and the first display processor 40. The rate at which the second display processor 42 accesses the color pixel data is likewise determined by the display and refresh needs of the particular display device to which it is connected, but is generally completely independent of the refresh rate of the first display process. And when dithering is used to enhance color depth, the second display processor 42 must operate at a much higher frame rate than the rate required by the first display processor 40 for a color CRT monitor or a television receiver.

When the data in the on-screen buffer 38 is coded in one of the direct-color modes, it is theoretically possible for the first and second display processors 40, 42 to fetch the color data from the on-screen buffer 38 at rates determined by the needs of their respective display devices, process the data, and display it as a color image on each display device. But when the data in the on-screen buffer 38 is coded in an indexed-color mode, it is first necessary to convert that indexed-color mode data to a direct-color mode before display on any device. In a worst case, such as when the first device is an interlaced TV and the second device is a color DSTN flat-panel using fall dithering for color depth enhancement, that would mean that each display processor 40, 42 will fetch the data from the on-screen buffer 38 at its own rate, independently convert the fetched data from the indexed-color mode to a direct-color mode and output the data to its respective device.

To date, no one has been able to solve that problem because of the limitations of the bandwidth of the shared address and data bus 14 used to access the external display memory 16. The Virtual Refresh™ architecture offers a solution to this problem by taking a copy of the direct-color mode data after it has been converted from indexed-mode data by the first display processor 40, reducing the bandwidth of this direct-color mode data, and writing a copy back to an off-screen buffer portion 50 of the external display memory 16. Now the second display processor 42 fetches this reduced bandwidth copy at a rate compatible with the needs of its own display device and without using so much of the bandwidth of the shared address and data bus 14. The Virtual Refresh™ architecture permits interlaced TV and fully dithered color DSTN to be handled by a single-chip controller. That is a non-obvious advantage of the present invention.

When the color pixel data placed in the on-screen buffer 38 is coded in an indexed-color mode, i.e., 256 colors having 8 bits per pixel, the color data must be converted into a direct-color-mode before it is displayed, i.e., 24 bits per pixel—8 bits Red, 8 bits Green, and 8 bits Blue. When the first display device is a CRT or a TV, and the second display device is a flat panel display using dithering, the refresh rates of the two display devices are significantly different from one another. Both of these devices are unable to directly display the indexed-color mode data in the on-screen buffer 38. Therefore it is customary to make a copy of the converted direct-color-mode 24-bit data 46 for use by the second display device, and to place the copy into an off-screen buffer portion 50 of the external display memory 16. The second display processor 42 accesses the direct-color-mode data in the off-screen buffer 50 at a rate determined solely by the refresh needs and the color depth enhancement "dithering" needs of a flat-panel display device.

In a modern multimedia display system 10 such as illustrated in FIG. 1, display quality suffers if the copy of the on-screen color pixel data retained in the off-screen buffer 50 is stored as full 24-bit direct-color-mode data. That is because the need to write the 24-bit color pixel data into the off-screen buffer 50, and then to fetch the same 24-bit color pixel data for display on the flat panel device requires excessive bandwidth of the address and data bus 14. This shortcoming is particularly noticed when color depth enhancing "dithering" is employed because it significantly increases the number of accesses made to the off-screen buffer data during any period of time.

As mentioned above, in the present invention this problem is overcome in a novel way by reducing the bandwidth of the direct-color-mode color pixel data 46 before it is stored into the off-screen buffer 50. The reduction in bandwidth is enough to permit all the competing accesses via the common address and data bus 14 to occur without a noticeable degradation of display image quality.

As further shown in FIG. 2, a bandwidth reduction circuit 52 receives the 24-bit direct-color-mode data 46 provided by the first display processor 40 and converts that 24-bit color pixel data to 8-bit or, alternatively, to 16-bit color pixel data. This reduced bandwidth data is then stored into the off-screen buffer 50 via lines 54. The reduced bandwidth data is fetched via lines 56 from the off-screen buffer 50 by the second display processor 46 for display on a flat-panel device. The output 58 of the second display processor 42 is presented to a second display compatibility circuit 60 which provides the output signals 34 required by the specific second display device.

A power reduction feature of the Virtual Refresh™ architecture is shown in FIG. 2 and is described in the related U.S. patent application entitled "A Virtual Refresh™ Architecture for A Video-Graphics Controller", having Attorney Docket No. SILI-11-019. The feature will not be discussed here except to point out that it involves an on-screen activity detector 64 which monitors host 36 activity via line 66 and controls a clock control circuit 68. The clock control circuit 68 provides clock signals 70 for operating a portion of the single-chip video-graphics controller 12 shown enclosed by the broken line 62.

Display Memory Access

Figure 3:
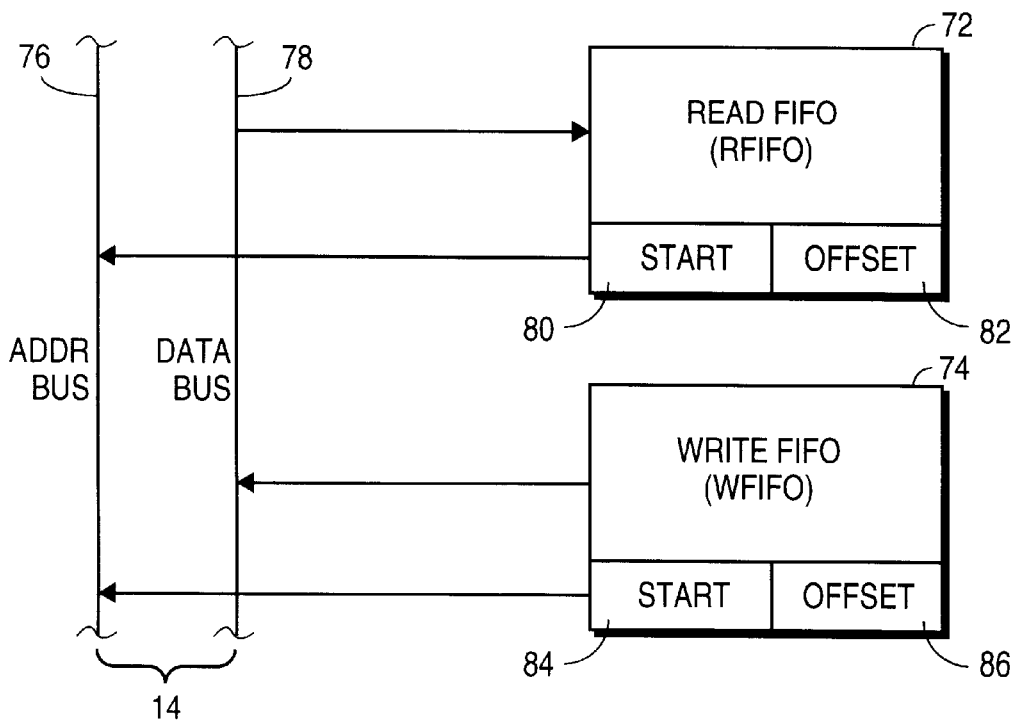
FIG. 3 is a partial block diagram showing read and write access agents connected to a bus for accessing an external display memory used in the multimedia display system of FIG. 1.

FIG. 3 is a partial block diagram illustrating the shared address and data bus 14 connected to a representative read FIFO 72 and write FIFO 74 for accessing the external display memory 16. The address and data bus 14 includes an address bus portion 76 and a data bus portion 78 shown here separately for a discussion of the typical read and write FIFO's 72, 74.

Though the detail is hidden in the simplified block diagram of FIG. 2, in a preferred embodiment of the present invention, the various paths between the single-chip video-graphics controller 12 and the external display memory 16 employ a shared memory controller (not shown) which mediates between the bus 14 and the individual processes using the bus, including the host 36, as described above. Each process gains access to the shared memory controller via a separate read or write FIFO, such as those shown in FIG. 3.

The particular arrangement of elements by which a FIFO indirectly gains access to the external display memory 16 gives the Virtual Refresh™ architecture much of its flexibility and power. This power is a direct result of each FIFO's having its own start address register 80, 84 and offset register 82, 86. The initial contents of these registers are programmable to permit a FIFO to read or to write a block of data starting at any storage location within the external display memory 16. In a preferred embodiment, the capacity of the external display memory 16 is 2MB and the width of each storage location is 64 bits. In a specific embodiment of the video-graphics controller 12, the read and the write FIFO's are 64 bits to match the width of the data bus portion of the shared address and data bus 14 and each storage location of the external display memory 16. In another specific embodiment, each read and each write FIFO is 32 64-bit words deep. The size of the FIFO's is selected to permit the concurrent of several independent processes, including but not limited to the accesses by the host 36 and the first and second display processors 40, 42 of FIG. 2.

Figure 4:
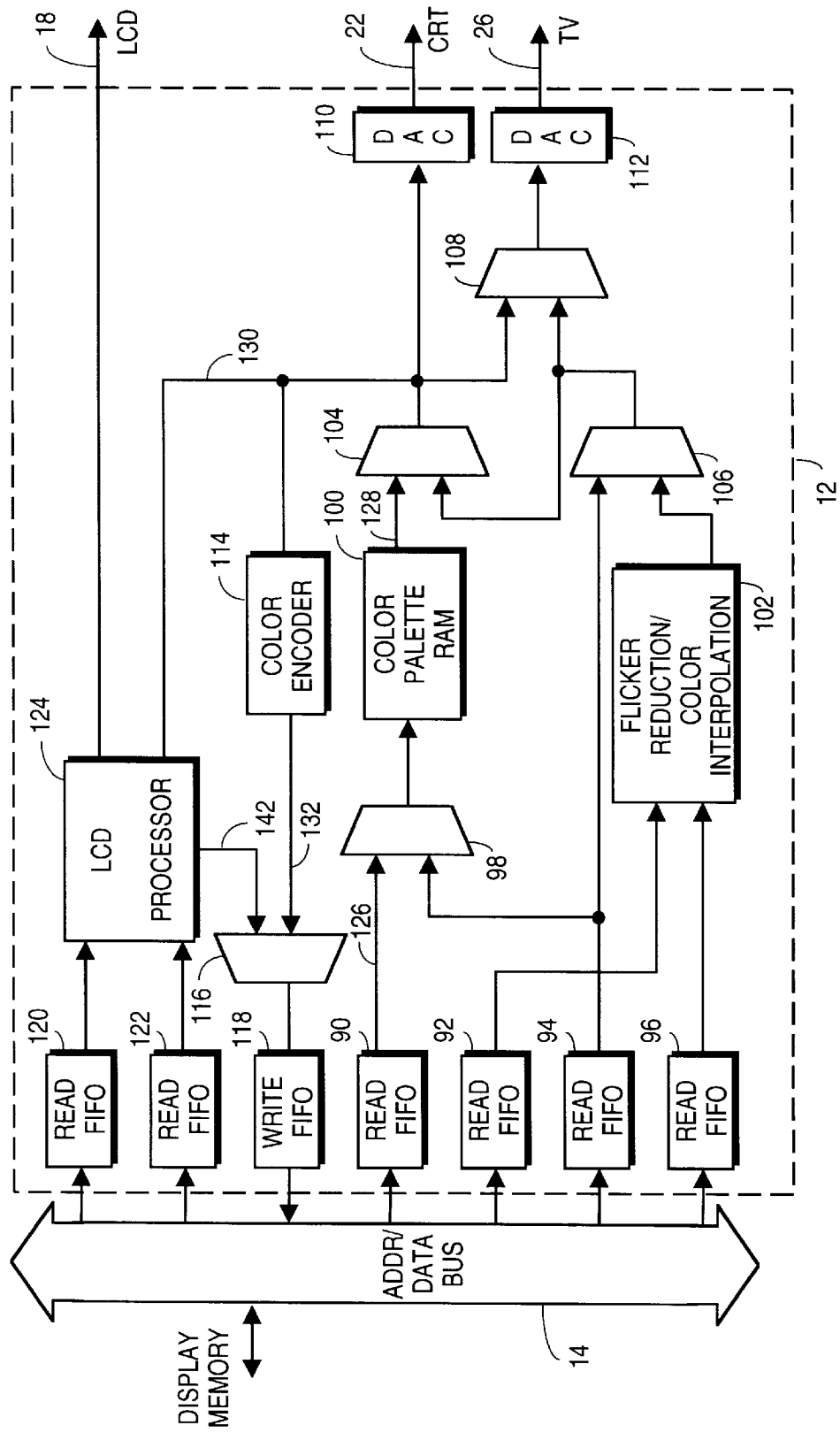
FIG. 4 is a block diagram which illustrates a specific embodiment of the single-chip video-graphics controller of FIG. 2.

A specific embodiment of the video-graphics controller 12 incorporating the Virtual Refresh™ architecture is shown in the block diagram of FIG. 4. The block diagram also includes the address and data bus 14 and the output lines 18, 22 and 26, as illustrated in FIG. 1. FIG. 4 focuses attention on the information flow from the external display memory 16 (not shown), through the video-graphics controller 12, to the output lines 18, 22, 26. Therefore the path between the host 36 and the on-screen buffer 38, and the on-screen activity detector 64 and clock control circuit 68, all of FIG. 2, are not shown in this view.

To understand the full power of the Virtual Refresh™ architecture, it is useful to relate parts shown in FIG. 2 with corresponding parts shown in FIG. 4. The first display processor 40 and the first display compatibility circuit 48 of FIG. 2 correspond to a combination of the following parts of FIG. 4: read FIFO's 90, 92, 94 and 96; a multiplexer 98; a color-palette RAM 100; a flicker reduction and color interpolation circuit 102; multiplexers 104, 106 and 108; digital-to-analog converters 110 and 112; and output lines 22 and 26. The bandwidth reduction circuit 52 of FIG. 2 corresponds to a combination of a color encoder 114, a multiplexer 116 and a write FIFO 118, all of FIG. 4. The second display processor 42 and the second display compatibility circuit 60 of FIG. 2 correspond to a combination of read FIFO's 120 and 122, an LCD processor 124, and the output line 18, all of FIG. 4.

The manner in which the parts illustrated in FIG. 4 cooperate to permit the simultaneous display of color data using previously incompatible devices is best understood by several examples.

EXAMPLE 1

Indexed-Color Mode to CRT Monitor and to TFT LCD

In the first example of the operation of video-graphics controller 12 of FIG. 4, we assume that the host 36 (FIG. 2) is periodically updating indexed-color mode pixel data in the on-screen buffer 38 (FIG. 2). This pixel data defines a color image which changes over time.

The read FIFO 90 is programmed to access the on-screen buffer 38. The result is a stream of indexed-color mode pixels, 8 bits per pixel, arriving on line 126 then through the multiplexer 98 and into the color-palette RAM 100. The purpose of a color-palette RAM is well understood in the art and it converts each 8-bit pixel of the arriving stream to a 24-bit direct-color mode pixel. The output of the color-palette RAM 100 appears on line 128 as a stream of direct-color mode 24-bit pixels corresponding to the image stored in the on-screen buffer 38. These direct-color mode pixels pass through the multiplexer 104 then via line 130 into three 8-bit digital-to-analog converters represented by the single numeral 110. The output at lines 22 are three analog signals corresponding to the red, green and blue signals required by a color CRT monitor. Though not shown in FIG. 4, the rate at which data is read from the on-screen buffer 38 is compatible with the refresh rate needs of the particular CRT monitor.

The direct-color mode pixel stream on the line 130 is received by the color encoder 114, previously described as corresponding to the bandwidth reduction circuit 52 of FIG. 2. The color encoder 114 is programmable to convert the direct-color mode pixel stream of 24-bit color pixels on the line 130 into, alternatively, a 16-bit direct-color mode pixel stream or an 8-bit direct-color mode pixel stream. In both cases there is a reduction in the bandwidth of the resulting pixel stream. The output of the color encoder 114 passes via the line 132 and the multiplexer 116 to the write FIFO 118 which is programmed to write the reduced bandwidth pixel stream into the off-screen buffer 50 of the external display memory 16.

The reduced bandwidth pixel data in the off-screen buffer 50 is now available for access and display by the second display processor 42 as described above with respect to FIG. 2. The reduced bandwidth data is read from the off-screen buffer 50 via the read FIFO 120 and is received as an 8- or 16-bit per pixel direct-color mode pixel stream by the LCD processor 124. The LCD processor 124 adjusts the reduced bandwidth pixel steam for compatibility with the TFT display of this example and outputs the pixel stream on output lines 18 for display by the TFT device. The rate at which the reduced bandwidth data is read from the off-screen buffer 50 is compatible with the refresh rate needs of the particular TFT device and is independent of the rate at which the data for the color CRT monitor is read from the on-screen buffer 38. By way of example, the CRT is refreshed at a rate of 30 frames per second, while the TFT display is refreshed at a rate of 60 frames per second. It is this possibility of having these two display processes, each operating independently at its own refresh rate, determined solely by the needs of a connected display device, that gives rise to the phrase Virtual Refresh™ architecture.

EXAMPLE 2

Indexed-color Mode to CRT Monitor and to DSTN LCD

The simultaneous display processes for this example make use of many of the parts discussed in the first example up to the point at which a reduced bandwidth copy of the on-screen buffer data has been written into the off-screen buffer 50. That previous discussion will not be repeated here.

Figure 5:
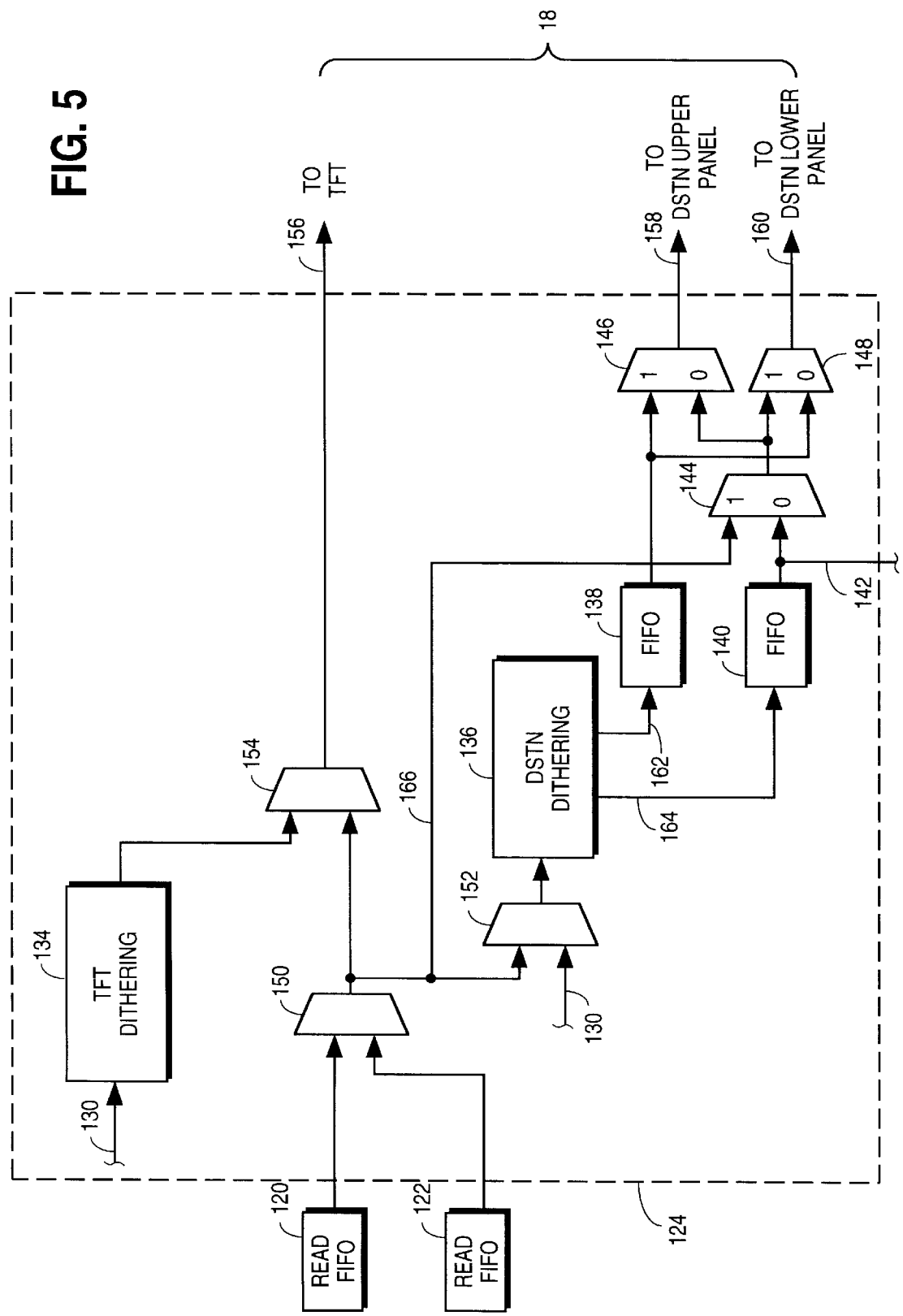
FIG. 5 is a block diagram showing a specific embodiment of a portion of the single-chip video-graphics controller shown in FIG. 4.

A specific embodiment of the LCD processor 124 of FIG. 4 is illustrated in the block diagram shown in FIG. 5. Parts contained within the LCD processor 124 are shown enclosed in a broken line in FIG. 5. These parts include a TFT dithering engine 134, a DSTN dithering engine 136, first and second DSTN dithering FIFO's 138, 140, an output line carrying a predicted-next-frame pixel stream 142, and multiplexers 144, 146 and 148 forming an upper/lower panel switch for a DSTN display. FIG. 5 includes the two read FIFO's 120, 122 shown in FIG. 4, and the output lines 18 of FIGS. 1 and 4 are shown including output lines 156 for driving a TFT display, output lines 158 for driving the upper panel of a DSTN display, and output lines 160 for driving the lower panel of a DSTN display. FIG. 5 includes multiplexers 150, 152 and 154, and the LCD processor 124 receives an input on line 130 carrying the direct-color mode 24-bit pixel stream. In a specific embodiment, the DSTN dithering FIFO's are each 8 bits wide by 6 deep.

The Virtual Refresh™ architecture permits an innovative solution to the DSTN dithering problem, relying upon the fact that each read FIFO and each write FIFO includes a start address register and an offset register (see FIG. 3) permitting the data to be written into and read from any block of storage locations within the external display memory 16.

A DSTN display device includes two halves, an upper panel and a lower panel. Display data is written to both panels simultaneously, a line at a time. For example, in a 640×480 pixel color DSTN display device, line 1 of the upper panel is written simultaneously with line 241, which is the first line of the lower panel. Then lines 2 and 242 are written. Then lines 3 and 243, etc., continuing through lines 240 and 480, respectively.

Dithering is used to enhance the color depth of the DSTN displayed image. Dithering is a time modulation process in which the image is repeatedly displayed at a very high rate to create an added brightness dimension, resulting in greater color depth than is possible by direct control of the individual pixels. A dithering engine examines a pixel read from the external display memory 16 and determines how often the pixel should be re-displayed at the high dithering rate.

In a specific embodiment of the present invention, as illustrated in FIG. 5, the direct-color mode 24-bit pixel stream on line 130 is received by the LCD processor 124, passes through the multiplexer 152 and enters the DSTN dithering engine 136. Two outputs are created by the DSTN dithering engine 136, a current-frame pixel stream on line 162 is delayed through the first DSTN dithering FIFO 138, while a predicted-next-frame pixel stream on line 164 is delayed through the second DSTN dithering FIFO 140 producing the delayed predicted-next-frame pixel stream on line 142 (also shown on FIG. 4). A As shown on FIG. 4, the delayed predicted-next-frame pixel stream on line 142 passes through the multiplexer 116 and over-writes one half of a frame previously stored in the off-screen buffer 50. One of the read FIFO's 120, 122 is programmed to read a previously stored delayed predicted-next-frame pixel stream, which passes through the multiplexer 150, along the line 166 to the multiplexer 144, then is selected through the pair of multiplexers 146, 148 and sent to the upper (lower) DSTN panel. Simultaneously, the current-frame pixel stream delayed by the first DSTN dithering FIFO 138 is selected by the pair of multiplexers 146, 148 and sent to the lower (upper) DSTN panel. Simultaneously, the delayed predicted-next-frame pixel stream on line 142 is being written by the write FIFO 118 whose start address and offset register have been programmed to overwrite the half of the frame in the off-screen buffer 50 that is currently being read by the read FIFO 120, 122. The overwriting is just behind the reading so that no information is lost. When the process reaches the end of the current frame, the offset registers of the read FIFO 120 and the write FIFO 118 are swapped and the multiplexers 146, 148 are switched so that the opposite DSTN panels receive current and previously written predicted-next-frame pixel streams.

EXAMPLE 3

Direct-Color Mode and TV Flicker Reduction

Figure 6:
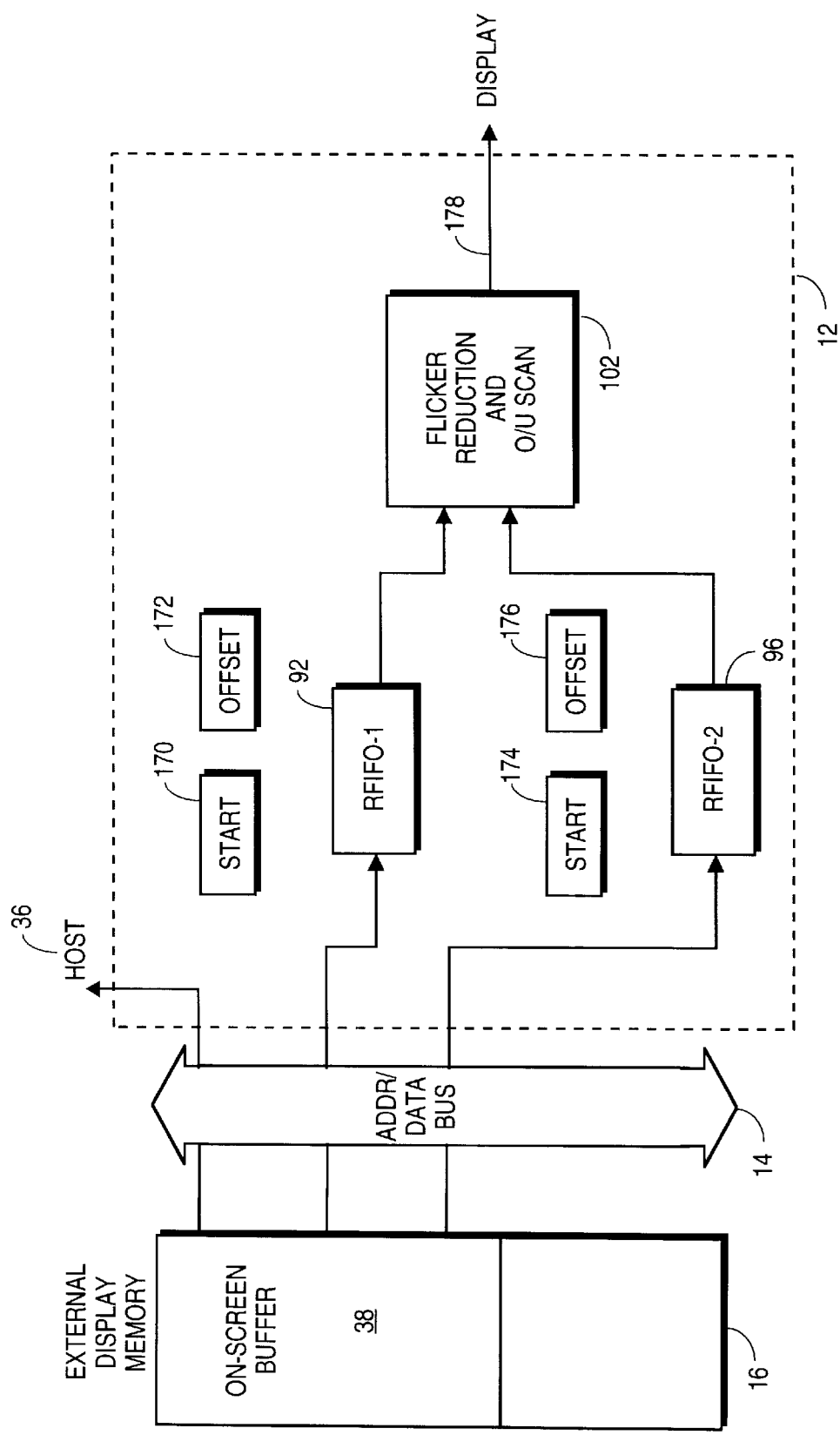
FIG. 6 is a block diagram illustrating a specific embodiment of a TV flicker reduction feature of the single-chip video-graphics controller of FIG. 1.

FIG. 6 is a block diagram which illustrates the data paths for the video-graphics controller 12 when data from the on-screen buffer 38 is processed for TV and flicker reduction is used to enhance image quality. The figure includes the video-graphics controller 12, the address and data bus 14, the external display memory 16, the host 36, the on-screen buffer 38, a first read FIFO 92 (FIG. 4), a second read FIFO 96, and a flicker reduction circuit 102.

In general, flicker reduction averages the color components of each color pixel in two adjacent display lines in an effort to reduce sudden intensity differences between adjacent lines. Such sudden differences in intensity result in an annoying "flicker" as a result of the interlaced scanning process used in standard NTSC (US) and PAL (European) television receivers and projectors. The apparent flicker decreases image quality and may have adverse physiological effects upon a viewer. The improvement in image quality observed using flicker reduction is most apparent when non-interlaced images are displayed on an interlaced CRT or TV system.

In an interlaced TV system, the displayed image is divided into two frames. During a first half of a scan cycle all the even numbered lines of the image are displayed, and during the second half of the scan cycle, all the odd numbered lines of the image are displayed. The resulting displayed image is a composite of the two halves. This interlaced scanning technique tends to create a flicker when there are sudden sharp intensity differences between corresponding pixels in adjacent lines. Flicker reduction circuits average the corresponding color pixels of adjacent lines in an effort to reduce this annoying artifact.

For example, during an even frame, lines 0 and 1 are fetched from the on-screen memory and averaged and the result is sent to the TV as line 0. Next, lines 2 and 3 are fetched and averaged and the result is sent to the TV as line 2. This process continues two-lines at a time throughout the even frame. When the odd frame begins, lines 1 and 2 are fetched and averaged and the result is sent to the TV as line 1. Then lines 3 and 4 are fetched and averaged and the result is sent to the TV as line 3.

The Virtual Refresh™ architecture enables the single-chip video-graphics controller 12 to handle flicker reduction "on-the-fly" without the need for one or more full line buffers commonly used for this purpose. The elimination of the full line buffers saves approximately 30,000 transistors per buffer. The elimination of the transistors also saves operating power.

To achieve the on-the-fly operation, the controller 12 includes a pair of programmable read FIFO's 92, 96 each having its own start address register 170, 174 and offset register 172, 176. In the present example, the read FIFO 92 is programmed to fetch the color pixels making up the even frame of the color image. The read FIFO 96 is programmed to fetch the color pixels making up the odd frame of the color image. Each read FIFO 92, 96 will provide a stream of color pixels corresponding to its even and odd frame.

In this example we assume that the color image in the on-screen buffer 38 is in a direct-color mode, therefore the pixel streams can be directly combined in the flicker-reduction circuit 102. This is shown in FIG. 6. The output of each read FIFO 92, 96 is connected as an input to the flicker-reduction circuit 102.

The flicker-reduction circuit 102 averages the separate red, green and blue components of corresponding pixels of both streams. The word "corresponding" as used here means that the separate color components of pixel number 1 of each stream are averaged, then the separate color components of pixel number 2 of each stream are averaged, etc. to the end of both streams. The averaged color components are output on line 178 to an interlaced display device.

During the even frame scan cycle in this example, the start register 170 and the offset register 172 are programmed to begin fetching the even frame pixel stream starting at the first color pixel of the first line of the even frame, i.e., pixel 1 of line 0. The start register 174 and the offset register 176 are programmed to begin fetching the odd frame pixel stream starting at the first color pixel of the first line of the odd frame, i.e., pixel 1 of line 1.

During the odd frame scan cycle in this example, the start register 170 and the offset register 172 are programmed to begin fetching the even frame pixel stream starting at the first color pixel in the second line of the even frame, i.e., pixel 1 of line 2. The start register 174 and the offset register 176 are programmed to begin fetching the odd frame pixel stream at the first color pixel of the first line of the odd frame, as described above.

Once started at the correct corresponding pixels, the two read FIFO's simply fetch successive color pixels of their respective even and odd frames, producing the two streams of corresponding pixels for averaging. The averaged pixels during the even frame scan cycle are output to the interlaced display device as an even display frame, while the averaged pixels during the odd frame scan cycle are output to the interlaced display device as an odd display frame.

In this manner, the corresponding pixels of adjacent lines are averaged to reduce flicker.

EXAMPLE 4

Indexed-Color Mode and TV Flicker Reduction

Now that the fundamentals of the flicker reduction process have been described, flicker reduction of an image stored in an indexed-color mode will be described with reference to FIG. 4.

The indexed-color mode is useful for minimizing the storage requirements for color images, but the images cannot be displayed directly. Indexed-color mode images must be converted to direct-color mode images before they can be displayed. The color palette RAM 100 is used for this purpose. Flicker reduction is done on the direct-color mode image.

In this example the indexed-color mode image is fetched from the on-screen buffer 38 using the read FIFO 90. The indexed-color mode data passes through the color palette RAM 100 which converts the indexed-color mode data to a direct-color mode. Then the direct-color mode data is passed through the color encoder 114 and the write FIFO 118 and is written into the off-screen buffer 50.

The read FIFO's 92, 96 are programmed to fetch the even frame and odd frame pixel streams from the off-screen buffer 50 and otherwise the description is identical to that provided in example 3, above.

EXAMPLE 5

Using Overscan/Underscan to Adjust Vertical Size

It is useful in the video-graphics field to have an ability to adjust the number of lines in a displayed image to correspond with the capabilities of a particular display device. For example, a common LCD display image is 640 pixels wide by 480 lines high, whereas an NTSC TV system displays images having 400 lines. When a 640×480 image is to be displayed on an NTSC TV system it is desirable to reduce the number of lines in the 640×480 image in a systematic way so that the displayed image does not appear "cropped" at the top and bottom.

The Virtual Refresh™ architecture provides an elegant solution to this problem through its plurality of programmable memory access agents (read and write FIFO's) as illustrated in FIG's 4 and 6. The ability to program the start address and offset for each read and write FIFO and to change those address registers (e.g., 170, 172, 174 and 176 of FIG. 6) during operation permits great flexibility in adjusting the number of lines in the final interlaced display image.

Figure 7:
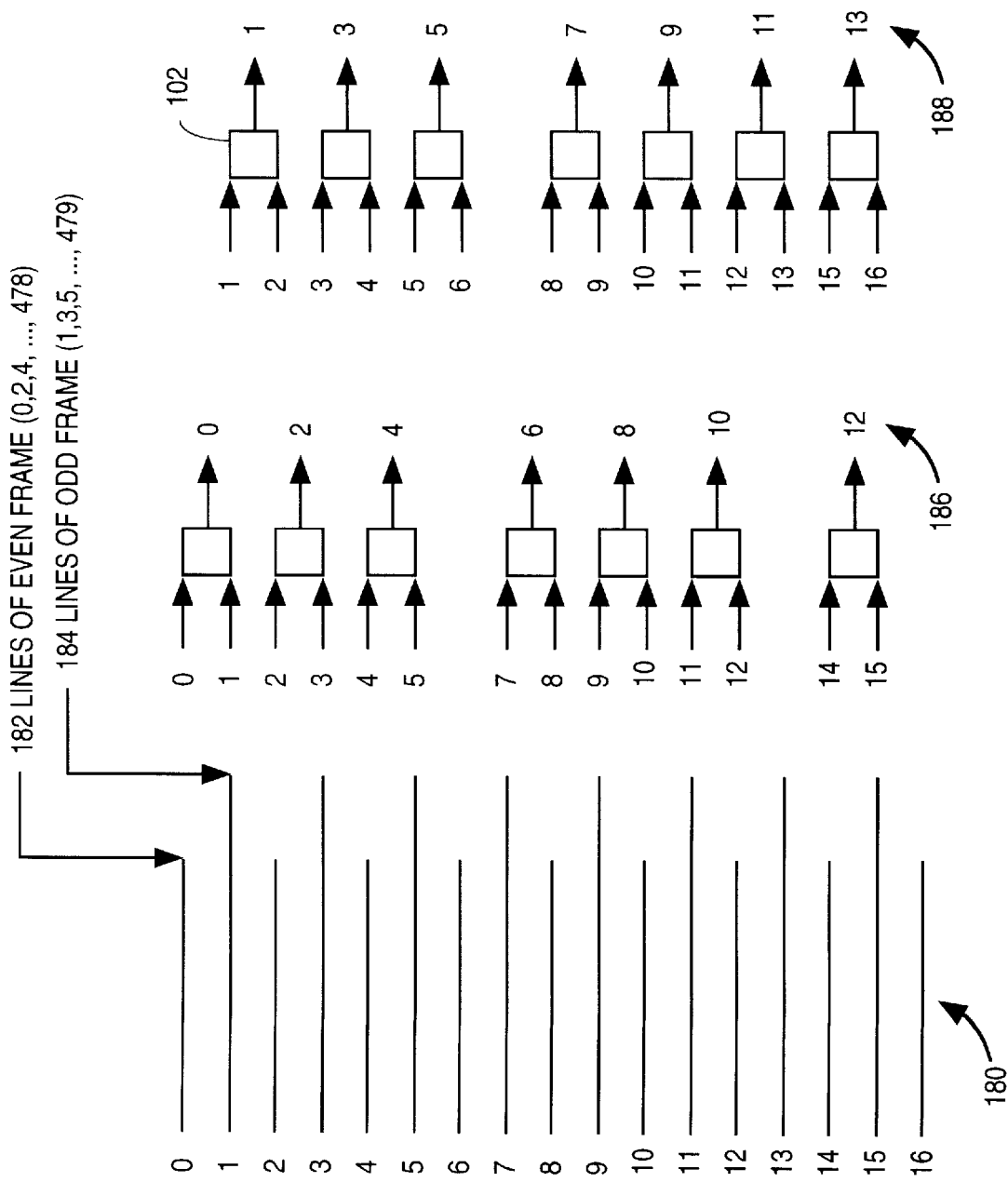
FIG. 7 is a schematic diagram illustrating a vertical stretching feature of the controller of FIG. 1.

In this example we assume there exists in the external display memory 16 a color image in a direct-color mode and formatted for a 640×480 flat-panel display. We also assume that the color image is to be displayed on a TV system requiring 400 lines. The following description is best understood with reference to FIG. 6 and to FIG. 7, a schematic diagram showing individual lines 180 of the even frame 182 and odd frame 184 of an interlaced display. The vertical size adjustment occurs using the flicker reduction averaging circuit 102.

In order to reduce the number of lines from 480 to 400, 80 lines will be eliminated. However, the information in the 80 eliminated lines will not be lost. The flicker reduction circuit 102 will be used to average the information contained in the eliminated lines into the 400 displayed lines. No image information is thrown away. An example will help to make this concept clear.

In this example, lines 0 and 1 are fetched and the corresponding color pixels are averaged and the result is output as an even frame line 0 (186 of FIG. 7) to the interlaced display. Then lines 2 and 3 are fetched and the corresponding color pixels are averaged and the result is output as an even frame line 2. Then lines 4 and 5. When the controller 12 reaches line 6, the address registers (170, 172, 174, 176 of FIG. 6) are commanded to skip one line so that the next two lines fetched are lines 7 and 8, then lines 9 and 10, then lines 11 and 12, then the address registers are commanded to skip one line and the next two lines fetched are lines 14 and 15, then lines 16 and 17, and so on to the end of the even frame. The result will be that exactly 40 lines have been eliminated and exactly 200 of the required 400 lines will have been output to the interlaced device as an even frame 186.

When the odd frame 184 is being output, the information contained in the previously eliminated lines (6, 13, 20, 27, . . . ) will be averaged into the output lines, and other lines (7, 14, 21, 28, . . . ) which were part of the even frame 186 will be eliminated, as will become more clear as the example continues.

The odd frame begins by programming the start address and offset registers to fetch lines 1 and 2. These lines are averaged and are output to the display device as the odd frame line 1 (188 of FIG. 7). Then lines 3 and 4. Then lines 5 and 6 (one of the previously eliminated lines). Then the address registers are commanded to skip one line and the next two lines are 8 and 9. Then lines 10 and 11. Then lines 12 and 13. Then the address registers are commanded to skip one line and the next two lines are 15 and 16, and so on to the end of the odd frame.

The controller 12 controls the start address and offset registers for each read and write FIFO. Therefore, the line-skips can be programmed to occur after any predetermined number of lines. This capability permits arbitrary adjustments to the number of lines sent to the interlaced display, and defines a "vertical stretch" feature of the single-chip video-graphics controller 12.

Full Motion Video Windows

The Virtual Refresh™ architecture provides a simple solution to the display of full-motion video windows superimposed upon a background image. This capability is shown in FIG. 4. The read FIFO 94 is programmable to fetch a full-motion video image from a portion of the external display memory 16. If the video image is stored in a direct-color mode, the pixel stream output by the read FIFO 94 passes through the multiplexer 106 and then either the multiplexer 104 or 108 depending upon which display device is being used. Chroma-keying is employed to control the insertion of the video window into the background image. When the video image is to be displayed on the flat-panel display, the output of multiplexer 104 is routed through the color encoder 114, then through the write FIFO 118 and the composite image is stored in the off-screen buffer 50. The normal LCD display process treats the composite image the same as any other direct-color mode image in the off-screen buffer 38, as described above.

The Virtual Refresh™ architecture also permits a second full-motion video window to be superimposed. The read FIFO 96 is programmable for that purpose and the pixel stream passes through the flicker reduction circuit 102 and is merged with the first video image at the multiplexer 106.

Vertical Line Color Interpolation

Vertical size is also adjustable using a vertical line color interpolation feature which is programmable to add one, two or three intermediate lines between each pair of adjacent lines in a non-interlaced color image. The Vertical Refresh™ architecture provides a novel solution to this problem by permitting multiple programmable use of controller resources.

The concepts are best understood with respect to FIG. 4 in which the read FIFO's 92 and 96 are programmed to fetch a pair of adjacent display lines of a direct-color mode image from the external display memory 16. The lines are processed by the flicker reduction and color interpolation circuit 102 which combines the separate components of each color pixel of the two adjacent lines according to standard color interpolation algorithms. The circuit 102 provides a display line at its output for driving a noninterlaced display.

In an example of the operation of the circuit, assume one of the read FIFO's 92, 96 has fetched the display line 0 of the image in the external display memory 16. The color interpolation circuit 102 is programmed to simply pass line 0 without modification. Line 0 is sent to the non-interlaced display. Next the two FIFO's 92, 96 fetch the display lines 0 and 1 of the stored image. The color interpolation circuit 102 is programmed to combine the separate color components of each color pixel of the two lines to create an intermediate additional line which is output to the non-interlaced display. Next, one of the FIFO's 92, 96 is programmed to fetch the display line 1 and the color interpolation circuit 102 simply passes the line to the non-interlaced display. In this manner, one new line is inserted between each existing pair of lines of the original image, doubling the vertical size of the original image.

The color interpolation circuit 102 is programmable to insert zero, one, two or three additional lines for increasing the vertical size of the displayed image. This vertical line color interpolation uses the unique resources of the Virtual Refresh™ architecture to accomplish this size adjustment without adding additional circuits to the single-chip video-graphics controller 12.

While the invention has been described in relation to the embodiments shown in the accompanying Drawing figures, other embodiments, alternatives and modifications will be apparent to those skilled in the art. It is intended that the Specification be only exemplary, and that the true scope and spirit of the invention be indicated by the following claims.

What is claimed is:

1. A single-chip video-graphics controller including a pair of independent display processors accessing color image data located in an external memory for display on devices having different display requirements, and wherein one display processor includes a flicker reduction feature for displaying a direct-color mode color image on an interlaced display device such as an NTSC color television projector, the color image for display on the interlaced device defining an even frame and an odd frame, each frame defining display lines of a frame, and the even frame also defining a first color pixel of a second display line of the even frame, the controller further comprising:

a pair of memory agents for separately fetching the even and the odd frames as two streams of color pixels;

a circuit for averaging the color pixels of two color pixel streams on-the-fly to provide a single color pixel stream;

a control circuit defining even and odd frame modes of operation, and in the even frame mode of operation using the memory agents and the averaging circuit to fetch and to average the two color pixel streams to provide a single color pixel stream as an averaged even frame to an interlaced display device, and to switch to the odd frame mode of operation upon the completion of the output of the averaged even frame;

in the odd frame mode of operation, the control circuit using the memory agents and the averaging circuit to fetch and to average the odd frame color pixel stream and a final portion of the even frame color pixel stream commencing at the first color pixel of the second display line of the even frame and continuing to the end of the frame, and to provide a single color pixel stream as an averaged odd frame to the interlaced device, and to switch back to the even frame mode of operation upon the completion of the output of the averaged odd frame; and the other display processor being able concurrently to access a color image at a rate sufficient to drive a fully dithered flat panel display without loss of image quality, whereby line-to-line flicker in the interlaced display image is reduced without the use of one or more full line buffers, as required in most flicker reduction applications.

2. A method for reducing line-to-line flicker for improving the appearance of an interlaced display image for use in a single-chip video-graphics controller connected to access the contents of an external display memory, the memory contents defining the interlaced display image as an even frame and an odd frame, the method comprising the steps of:

providing an external memory storing the color display image in a direct color mode;

providing a single-chip video graphics controller having a pair of independent display processors for display of a color pixel image simultaneously on display devices having different refresh requirements, and one display processor having a pair of independent memory agents for accessing a direct-color mode color display image and the other display processor being able concurrently to access alternatively a color image at a rate sufficient to drive a fully dithered flat panel display without loss of image quality;

using one agent to fetch the even frame of the interlaced display, the even frame defining an even stream of direct-color mode color pixels;

using the other agent to fetch the odd frame of the interlaced display, the odd frame defining an odd stream of direct-color mode color pixels;

separately counting the pixels in each stream;

defining corresponding pixels of the two streams as pixels having the same pixel count;

combining corresponding pixels of the two streams according to a known flicker-reduction algorithm, producing a single even frame pixel stream;

converting the even frame pixel stream for compatible output to an interlaced display device;

defining an offset count corresponding to twice the number of pixels in a single display line of the interlaced display device;

using one agent to fetch the odd frame of the interlaced display;

using the other agent to fetch the even frame commencing a number of pixels equal to the offset count from the beginning of the even frame;

separately counting the pixels in each stream;

combining corresponding pixels of the two streams according to the known flicker-reduction algorithm, producing a single odd frame pixel stream; and converting the odd frame pixel stream for compatible output to the interlaced display device, whereby the even and odd frames are output to the interlaced display device without the use of one or more full line buffers as is common in many flicker reduction methods.

3. The method as set forth in claim 2, wherein the step of combining corresponding pixels of the first and second streams includes the steps of averaging the separate red, green and blue components of the corresponding pixels to produce averaged red, green and blue components of the combined pixel stream.

4. The method as set forth in claim 2, wherein the step of converting the combined pixel stream for compatible output includes passing the separate red, green and blue components of each pixel of the combined stream through separate digital-to-analog converters for providing analog RGB output signals.

5. A single-chip video-graphics controller including a pair of independent display processors accessing color image data stored in an external memory for concurrent display on devices having different refresh requirements, one display processor including a flicker reduction circuit for displaying a color image on an interlaced display device such as an NTSC color television projector, the video-graphics controller including a pair of memory access agents permitting said one display processor to concurrently fetch a direct-color mode color image as adjacent lines of separate even and odd frames, and including a circuit for averaging adjacent direct-color mode pixels of each frame for reducing line-to-line flicker on-the-fly without the use of one or more full line buffers, thereby saving chip layout area and operating power, the other display processor being able concurrently to access a color image at a rate sufficient to drive a fully dithered flat panel display without loss of image quality.

6. The single-chip video-graphics controller as set forth in claim 5, further including a third memory access agent for concurrently fetching a full-motion video image from a portion of the external display memory, and including circuits using chroma-keying to insert the video image within a chroma-keyed window of the color averaged frames forming a composite color image for display on the interlaced device.

7. The single-chip video-graphics controller as set forth in claim 6, further including a fourth memory access agent for concurrently fetching a second full-motion video image from another portion of the external display memory, and using the same chroma-keyed circuits to insert the second video image within a second chroma-keyed window of the color averaged frames thus forming a composite color image having two fall-motion video windows for display on the interlaced device.

8. The single-chip video-graphics controller as set forth in claim 5, further defining display lines of the even and the odd frames, and including programmable means for causing the pair of memory access agents to fetch portions of the even and the odd frames according to a predetermined schedule for skipping lines, whereby the vertical size of the displayed image can be adjusted to be smaller than the original image.

9. The single-chip video-graphics controller as set forth in claim 5, further defining display lines of the stored color image, and including programmable means for fetching pairs of adjacent lines, for combining the separate color components of corresponding color pixels of the adjacent lines, and for forming, an additional line for insertion between the fetched adjacent lines in the displayed image, whereby the vertical size of the displayed image can be adjusted to be larger than the original image by the insertion of the additional line between the fetched adjacent lines.

10. The single-chip video-graphics controller as set forth in claim 9, further including said programmable means combining corresponding color pixels of the adjacent lines to form two additional lines and, alternatively, three additional lines for insertion between the fetched adjacent lines in the displayed image.

* * * * *